June 12, 1934.  A. F. BENNETT  1,962,979
MACHINE TOOL
Filed May 20, 1933   8 Sheets-Sheet 5

Witness
Chas. T. Olson

Inventor
Arthur F. Bennett
by Fish Hildreth
Cary & Jenney Attys

Patented June 12, 1934

1,962,979

UNITED STATES PATENT OFFICE 1,962,979

MACHINE TOOL

Arthur F. Bennett, West Barrington, R. I., assignor, by mesne assignments, to Associated Patents, Inc., Cincinnati, Ohio, a corporation of Ohio Application May 20, 1933, Serial No. 672,026

17 Claims. (Cl. 90—21)

The present invention relates to improvements in machine tools, and is herein disclosed as embodied in a milling machine provided with a movable work support, a feed screw and nuts cooperating therewith for actuating the support together with a take-up device for securing a tight working engagement between the nuts and the screw.

It is a principal object of the present invention to provide means for controlling the operation of the take-up device above mentioned to eliminate any possible backlash in the nut and screw feed during the power operation of the support in either direction to perform any required operation on the work, while permitting a free operating engagement of these elements during a manual or quick traverse movement of the support into and out of operating position.

It is another object of the invention to provide in a machine of this general description a control mechanism for the take-up device which will cause the take-up device to be automatically eased off during the quick traverse operation of the support to permit a free working engagement between the nuts and screw, and will cause the take-up device to be again rendered operative to eliminate backlash between the screw and nut connections upon return of the support to slow power feed operation.

With these and other objects in view, as may hereinafter appear, the several features of the invention consist in the devices, combinations and arrangement of parts hereinafter described and claimed which together with the advantages to be gained thereby will be readily understood by one skilled in the art from the following description taken in connection with the accompanying drawings, in which.

The machine illustrated in the drawings as embodying in a preferred form the several features of the present invention, comprises a manufacturing type milling machine in which the work is supported on a work support or table movable in a horizontal plane with relation to a vertically adjustable rotary milling cutter. The table is power driven by means of a reversible constant speed electric motor and intervening driving connections which include relatively rotatable screw and nut elements for actuating the table, a slow traverse gear train, a quick traverse gear train, and a clutch connection movable from a neutral position to engage one or the other of said gear trains to drive the table alternatively at a feeding or quick traverse rate.

With the present construction there is also provided in the table drive, a take-up device comprising an additional nut threaded to the feed screw and adjustable with relation to the usual cooperating nut to secure a tight operating engagement between the feed screw and nut elements. This device operates to take up any possible wear between the screw and nut connections, and more particularly to eliminate any play in the parts which would tend to set up undesirable vibration or chatter between these elements, as for instance in hook milling where the tendency is for the cutter to drive the table ahead of the feed train.

It has been found, however, that a take-up device of this general description while operating satisfactorily under power feed conditions, results in an increase in the frictional load on the driving elements which is undesirable for a manual or quick traverse operation of the table. In order to secure a satisfactory and efficient operation of the machine under all conditions, means is provided in the illustrated machine for controlling the operation of the take-up device to secure a tight operative engagement between the feed screw and nut elements during the power feed operation of the table in either direction, while permitting a free operative engagement between these elements during the manual or quick traverse operation of the table. The take-up device disclosed comprises a spring-pressed take-up member which acts through irreversible cam connections to move one nut axially with relation to the other for securing a tight operating engagement between the nuts and the feed screw, and a hydraulically operated piston for moving the take-up member against the pressure of its spring to relieve the tension on the nuts.

With the present construction the operation of the machine is controlled partly through electrical connections and partly through hydraulic connections to insure a reliable and efficient operation of the machine. These connections include a starting and stopping switch and a reversing switch for the motor, and a quick traverse switch which controls the operation of a hydraulic valve to move the clutch alternatively to slow feed or quick traverse position. Hydraulic connections are provided which are rendered operative upon the setting of the main valve for quick traverse operation to supply liquid pressure to the piston for the take-up member to render the take-up device inoperative as above described, and upon the return of the main valve to low speed position, to exhaust the pressure to the piston to re-engage the take-up device. The hydraulic connections for the machine include also a valve which is rendered operative upon engagement of the hand feed for the table to supply liquid pressure for actuating the piston for the take-up member to disengage the take-up device.

Referring more specifically to the drawings, a work supporting table is indicated at 20 mounted to slide on ways 22 formed on the base 24 of the machine. A rotary milling cutter spindle 26 is supported above the table in a casing 28 which is supported for vertical adjustment on a machine column 30. With the machine herein disclosed, the cutter spindle is driven by means of a separate motor 32 through connections generally indicated in dotted lines in Fig. 1.

Figure 3:
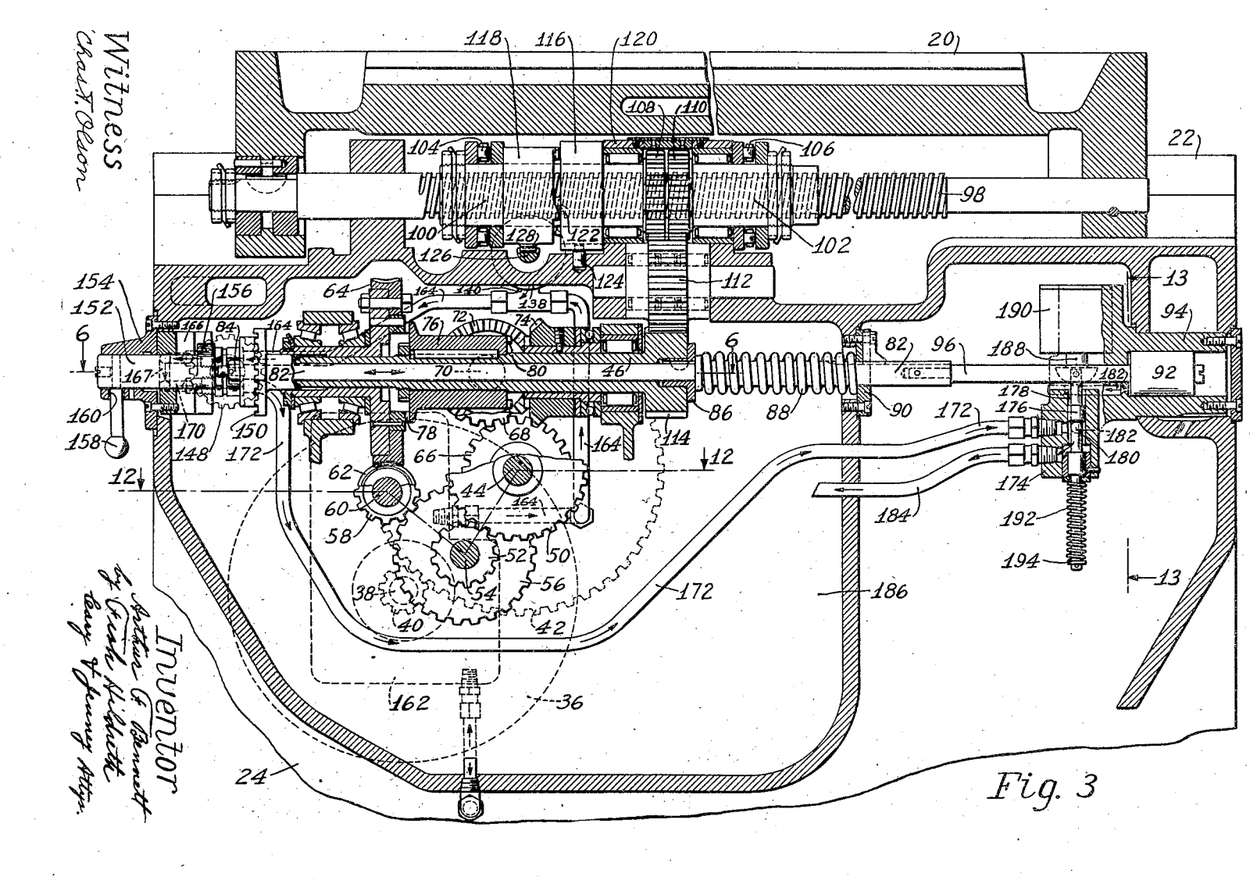
Fig. 3 is a sectional view in front elevation illustrating particularly the driving mechanism for the table.
Figures 6, 7, 8, 9, 10, 11:
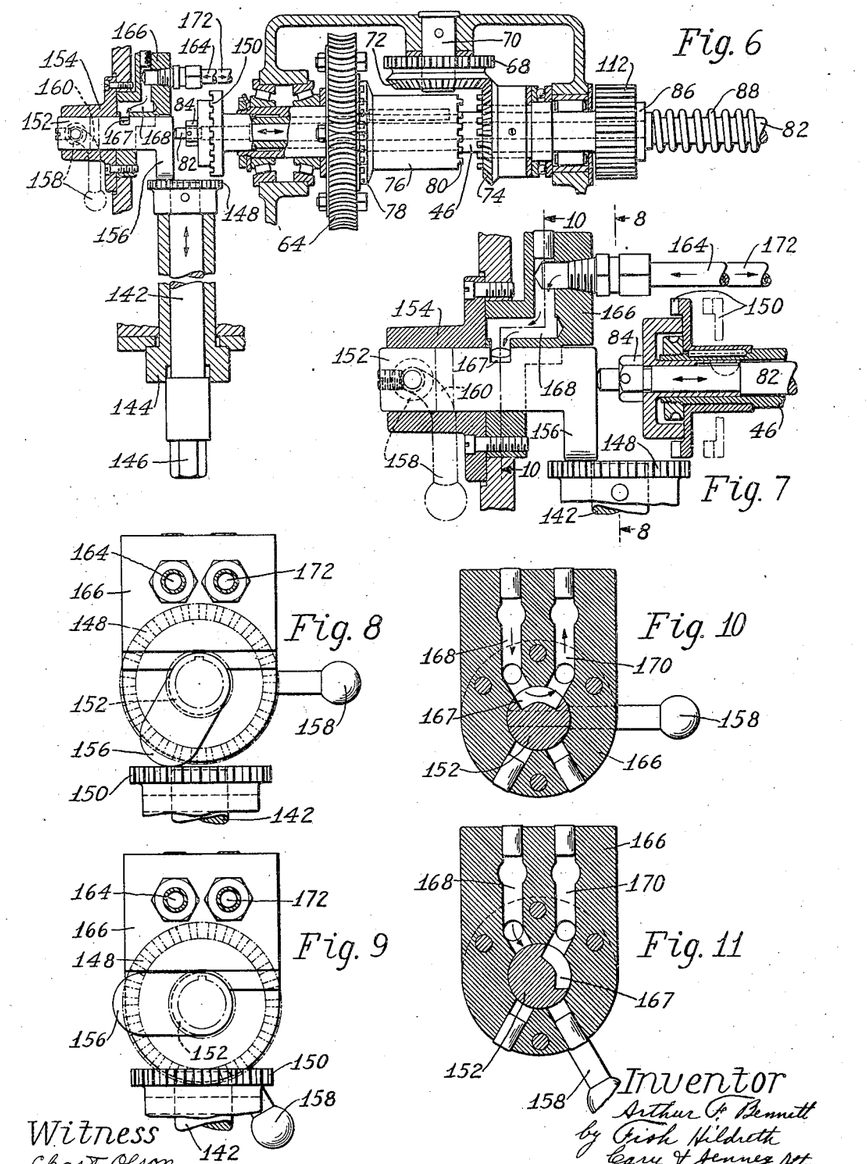
Fig. 6 is a detail sectional plan view taken on the line 6—6 of Fig. 3 to illustrate particularly the connections for manually feeding the table and certain of the power driving connections including the slow feed and quick traverse clutch.
Fig. 7 is an enlarged detail sectional view of the manual feed control member and certain of the parts actuated thereby as shown in Fig. 6.
Fig. 8 is a detail sectional view taken on the line 8—8 of Fig. 7 illustrating the rest position of the manual feed control member and the actuating cam controlled thereby.
Fig. 9 is a view similar to Fig. 8 with the member shown in operative position to engage the hand feed.
Fig. 10 is a sectional view taken on the line 10—10 of Fig. 7 to illustrate particularly the valve associated with the hand feed control member for disengaging the take-up device, the parts being shown with the member in rest position.
Fig. 11 is a view similar to Fig. 10, but with the hand feed control member and valve mechanism shown in operative position to engage the hand feed.
Figure 12:
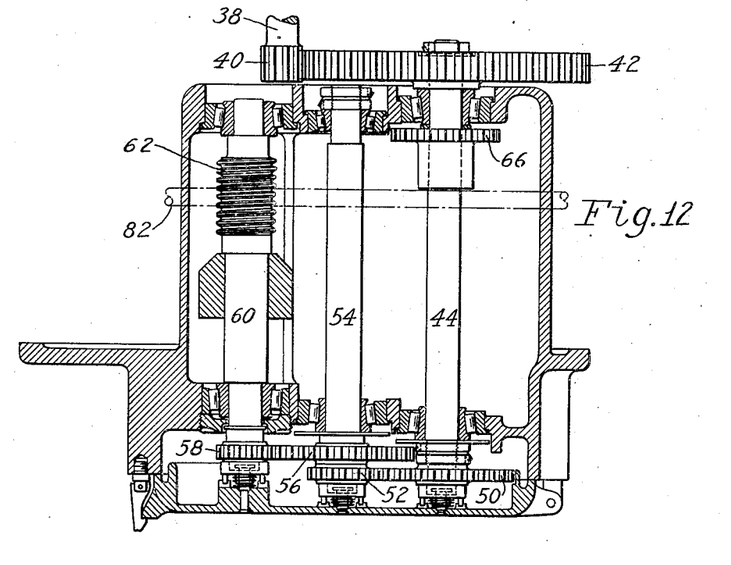
Fig 12 is a detail sectional view taken on the line 12—12 of Fig. 3 to show more particularly certain of the driving connections from the table driving motor.
Figure 13:
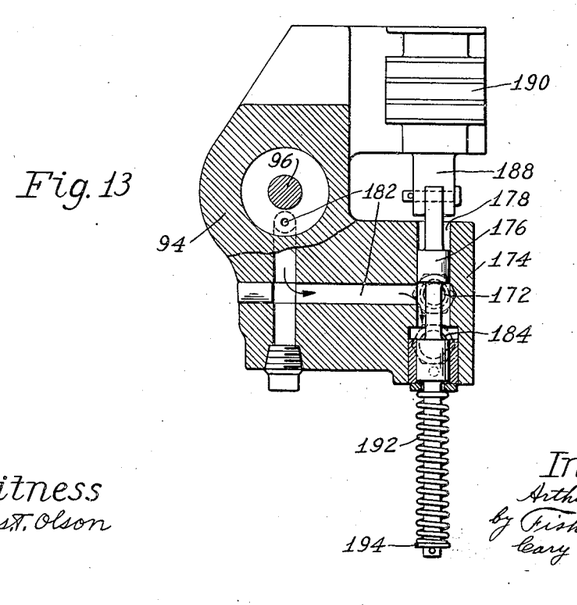
Fig. 13 is a detail sectional view taken on the line 13—13 of Fig. 3, to illustrate particularly the control valve mechanism for the slow feed and quick traverse clutch.

The work table 20 is driven from a reversible constant speed electric motor 36 through driving connections which include slow feed and quick traverse gear trains and clutch connections for alternatively connecting one or the other of these trains to drive the table. As best shown in Figs. 3, 6 and 12, there is supported on the armature shaft 38 of the motor a gear 40 which meshes with a gear 42 secured to a connecting drive shaft 44. The shaft 44 is connected to drive the main drive shaft 46 of the machine at a slow traverse rate through gear connections comprising intermeshing take-off gears 50 and 52 secured respectively to the shaft 44 and to an idler shaft 54. A second gear 56 on the idler shaft 54 meshes with a gear 58 on a shaft 60 which carries a worm 62 adapted to mesh with a worm gear 64 loosely sleeved to turn on the drive shaft 46. The shaft 46 may be driven at a quick traverse rate from the shaft 44 through gear connections comprising a gear 66 secured to the shaft 44 which is arranged to mesh with a sleeve gear 68 mounted to turn on a short pivot shaft 70. A bevel gear 72 formed integrally with the sleeve gear 68 meshes with a corresponding bevel gear 74 loosely sleeved to turn on the drive shaft 46.

A slow speed and quick traverse clutch member 76 is rigidly secured to the driving shaft 46 between the slow feed worm gear 64 and the quick traverse bevel gear 74, and is provided at one end with a jaw tooth clutch 78 arranged to engage with a corresponding clutch member formed on the face of the worm gear 64, and at its other end is provided with a jaw tooth clutch face 80 arranged to engage with a corresponding jaw tooth clutch member formed on the adjacent face of the bevel gear 74. Movement of the slow feed and quick traverse clutch 76 to engage alternatively with the slow feed driving worm gear 64 or with the quick traverse bevel gear 74, is effected by an endwise movement of the drive shaft 46 controlled by means of a shifting rod 82 which passes through an axial bore in the drive shaft 46. A nut 84 and a collar 86 are secured to the shaft to engage with opposite ends of the drive shaft 46 to cause the drive shaft 46 to move axially with the shifting rod 82 while permitting the drive shaft to rotate with relation thereto. A heavy compression spring 88 coiled about the shifting rod 82 between a bearing plate 90 secured to the machine frame and the collar 86 on the rod 82, tends normally to hold the shaft 46 and clutch 76 to the left as viewed in Fig. 3, with the clutch face 78 in engagement with the slow feed worm gear 64. Movement of the drive shaft 46 and the clutch 76 in an opposite direction to engage the quick traverse bevel gear 74 is effected by means of a hydraulically operated piston 92 arranged to slide in a pressure chamber 94 and secured by means of a connecting rod 96 to move axially with the shifting rod 82 and drive shaft 46.

The table 20 is driven from the drive shaft 46 through driving connections which comprise a stationary feed screw 98 rigidly secured to the table 20, and a pair of rotatable nuts 100 and 102 screw-threaded on the feed screw 98, and supported by end thrust bearings 104 and 106 against lengthwise movement in the machine. For rotating the nuts to impart the required feeding movements to the feed screw 98 and table 20 from the drive shaft 46, two gears 108 and 110 formed respectively on the nuts 100 and 102 are arranged to mesh with an idler gear 112 which in turn meshes with a driving gear 114 on the drive shaft 46.

In order to secure a tight operating engagement between the nuts 100 and 102 and the feed screw 98, and thus to prevent any possible backlash or chatter in the table drive, mechanism is provided for imparting a relative axial movement to the nuts to bring these elements tightly into engagement with the threads of the feed screw 98. This mechanism comprises two sleeve members 116 and 118 loosely sleeved on the nut 100, and interposed between a fixed bearing 120 for the nut 100 and the end thrust bearing 104 above described. Corresponding cam surfaces 122 are formed on the adjacent faces of the sleeve members 116 and 118, so that a relative rotational movement of these members will act through the end thrust bearing 104 to move the nut 100 to the left as shown in Fig. 3, to secure a tight operating engagement between the nut 100 and the feed screw 98. The sleeve member 116 is held against turning by means of a key 124.

Figure 4:
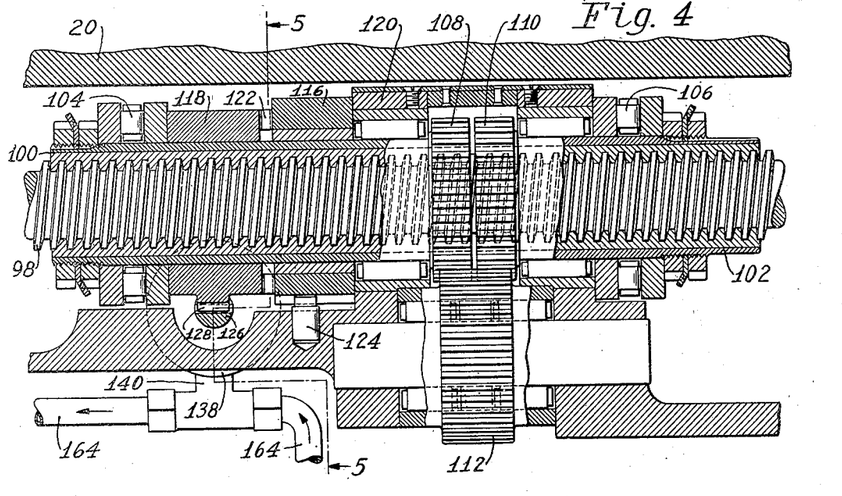
Fig. 4 is an enlarged detail view in section of the feed screw and cooperating nuts, and the take-up device for eliminating backlash between these elements of the table drive.
Figure 5:
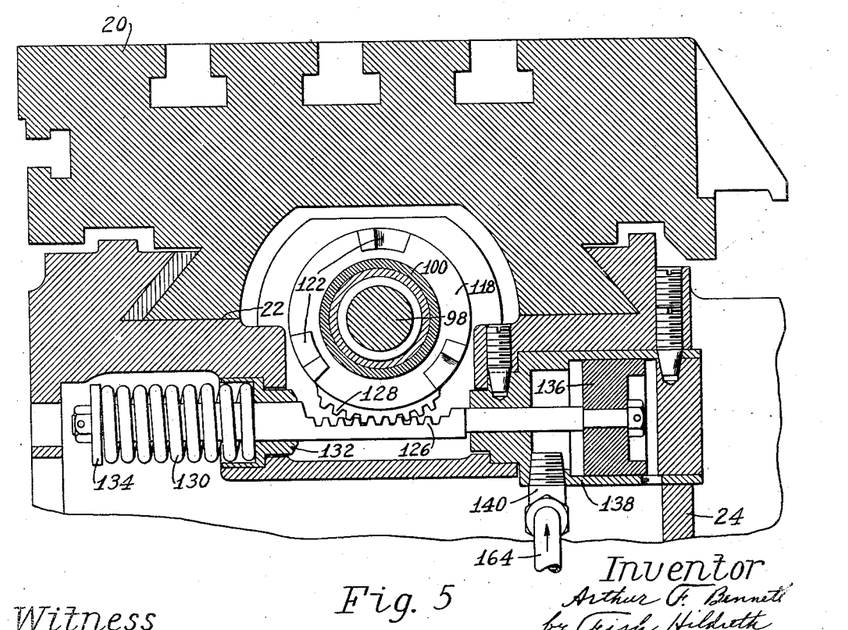
Fig. 5 is a section taken on the line 5—5 of Fig. 4.

The angular position of the sleeve 118 with relation to the sleeve 116 to tighten or loosen the nuts 100 and 102 with relation to the feed screw 98, is controlled, as best shown in Figs. 4 and 5, by means of a rack 126 which meshes with a corresponding gear segment 128 formed on the cam sleeve 118. A compression spring 130 coiled about the rack rod 126 and seated at one end in a recess formed in the bearing 132 for the rack rod, and at its other end against a collar 134 on the end of the rod, tends to move the rack to the left as shown in Fig. 5, to take up the nuts. The compression spring acts against the cam sleeve to impart a lengthwise tensioning strain to the nuts in opposite directions against fixed end thrust bearings. The angle of the cam surfaces employed is such as to permit the employment of a relatively light spring to secure a relatively heavy tensioning strain on the nuts, and is further arranged to provide an extremely high resistance to any easing-off action of the nuts against the combined force of the spring and the frictional resistance of the cam surfaces. The resistance thus provided is sufficient to prevent any yield in the take-up mechanism under the strains of hook milling. With this construction it will be seen that while a yielding spring pressure is utilized to take up the nuts, the arrangement of the cam surfaces 122 provides a substantially irreversible cam action, so that the entire strain upon the connections due to the operation of the cutter against the work is taken up against the end thrust bearings 104 and 106 and the stationary bearing 120 above described, to maintain a positive control of the position of the table under all conditions during feeding movements of the table in either direction. For rotating the cam sleeve 118 in an opposite direction to loosen the operative connection between the nuts and the feed screw 98, a piston 136 is secured to the right hand end of the rack bar 126, as shown in Fig. 5, and is arranged to slide in an oil pressure cylinder 138, so that the introduction of oil under pressure through the inlet pipe illustrated at 140 in Fig. 5, will move the piston and rack bar to the right as shown in Fig. 5, against the pressure of the spring 130 to loosen the nuts.

The illustrated machine is provided with hand feed operating connections together with a control mechanism therefor which is arranged normally to maintain the hand feed out of operation, and acts when rendered operative to permit the engagement of the hand feed and simultaneously to move the slow feed and quick traverse clutch to neutral position. The hand feed operating connections as best shown in Figs. 3, 6 and 7, comprise a forwardly extending shaft 142 which is mounted for axial and rotational movements in a bearing 144. At its forward end the shaft is provided with a squared end 146 to receive a manually operable crank handle of ordinary description, and at its rear end carries a gear 148 arranged to mesh with a corresponding crown gear 150 on the drive shaft 46. It will be seen from an inspection of Fig. 6 that the shaft 142 may be moved rearwardly to bring the gear 148 into operative engagement with the crown gear 150 only for a lengthwise position of the drive shaft 46 which corresponds to a neutral or intermediate position of the slow speed or quick traverse clutch 76. The mechanism for controlling the operation of the hand feed comprises a plug 152 journalled in a casing 154 axially in alignment with the drive shaft 46. At its inner end the plug is provided with a bearing surface arranged to engage with the end of the shifting rod 82, and with an offset cam 156 arranged to engage with the face of the gear 148 on the inner end of the hand feed shaft 142. For controlling the operation of the plug 152 to impart lengthwise and rotational movements thereto, a hand lever 158 is secured to the side of the plug 152 and extends outwardly through a cam slot 160 in the casing 154. With the plug in the normal inoperative position shown in Fig. 8, the plug is withdrawn out of engagement with the shifting rod 82, and the cam 156 is positioned to lock the hand feed shaft 142 and gear 148 in a retracted position out of engagement with the crown gear 150. When it is desired to throw the hand feed into operation, the control lever 158 is moved downwardly to the position shown in Fig. 9 to rotate the plug, and at the same time cause it to be advanced through the engagement of the control lever 158 with the cam slot 160 above described. This movement of the plug acts to move the cam 156 to permit a forward movement of the hand feed shaft 142, and simultaneously moves the shifting rod 82, drive shaft 46 and clutch 76 to the right, as shown in Fig. 6, against the pressure of the spring 88 to throw the clutch 76 into neutral, and to position the crown gear 150 for engagement with the gear 148 on the hand feed shaft 142.

Figure 14:
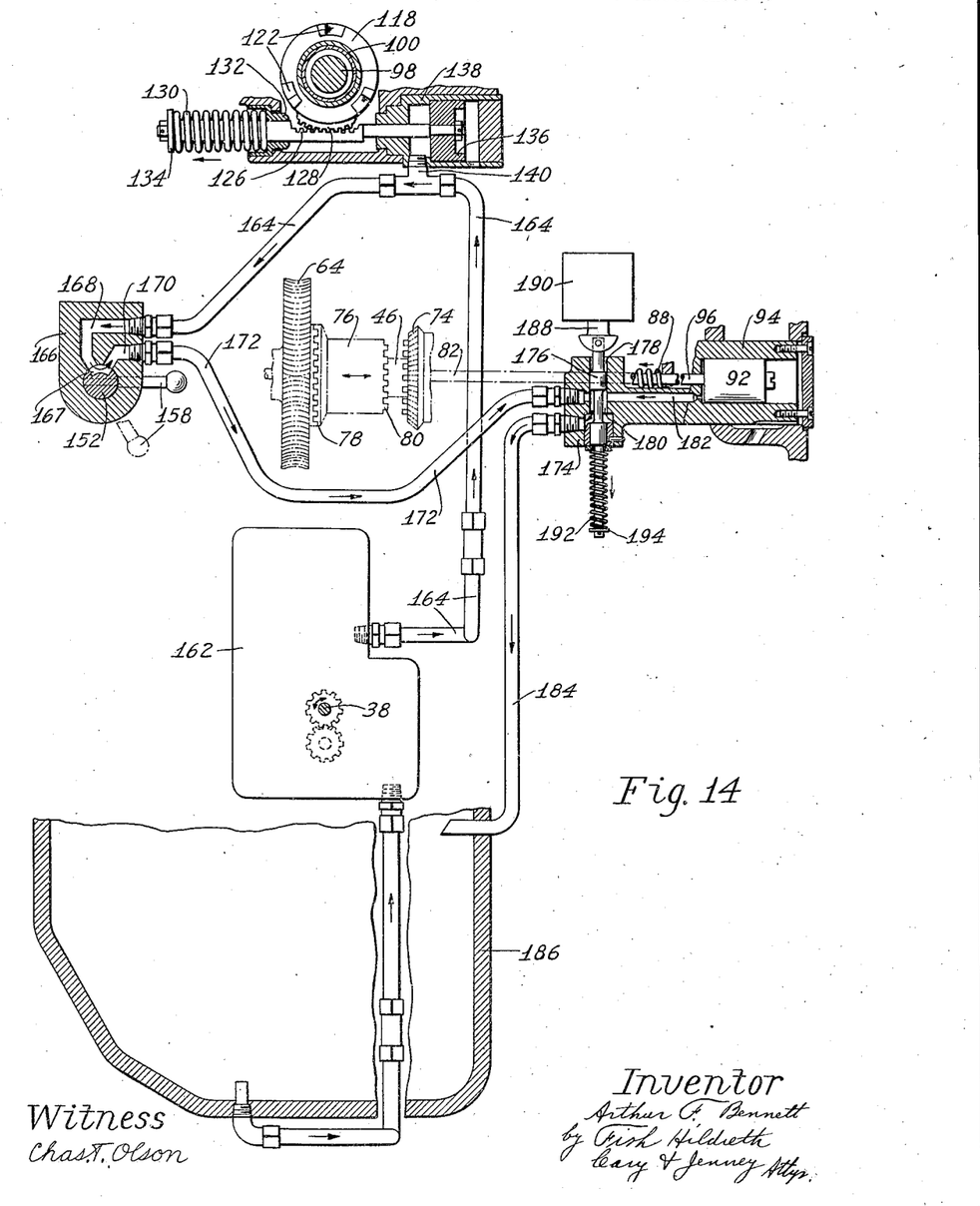
Figs. 14 to 16 inclusive are somewhat diagrammatic views of the oil pressure control mechanism for controlling the operation of the slow feed and quick traverse clutch and the backlash take-up device for the feed screw and nut elements of the table drive, Fig. 14 showing the parts in position for power feed operation, Fig. 15 showing the parts in position for quick traverse operation, and Fig. 16 showing the parts in position for hand feed operation.
Figure 15:
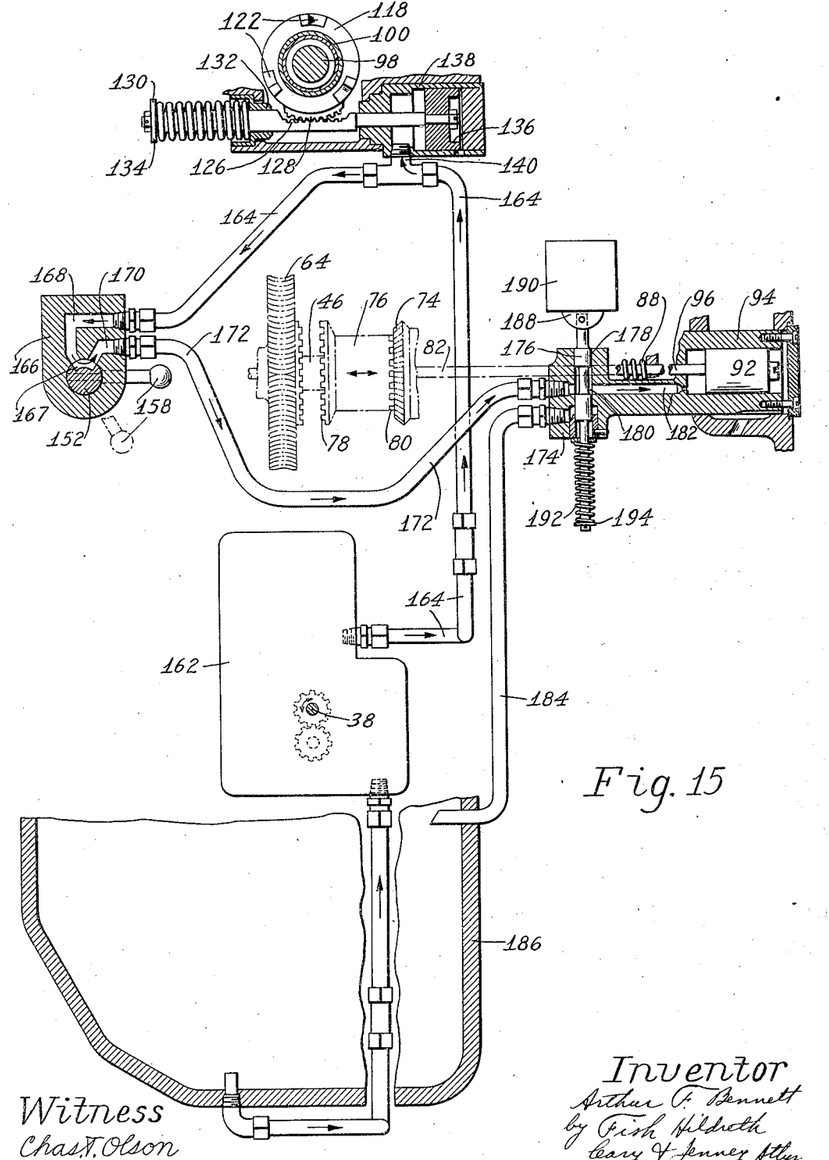
Figure 16:
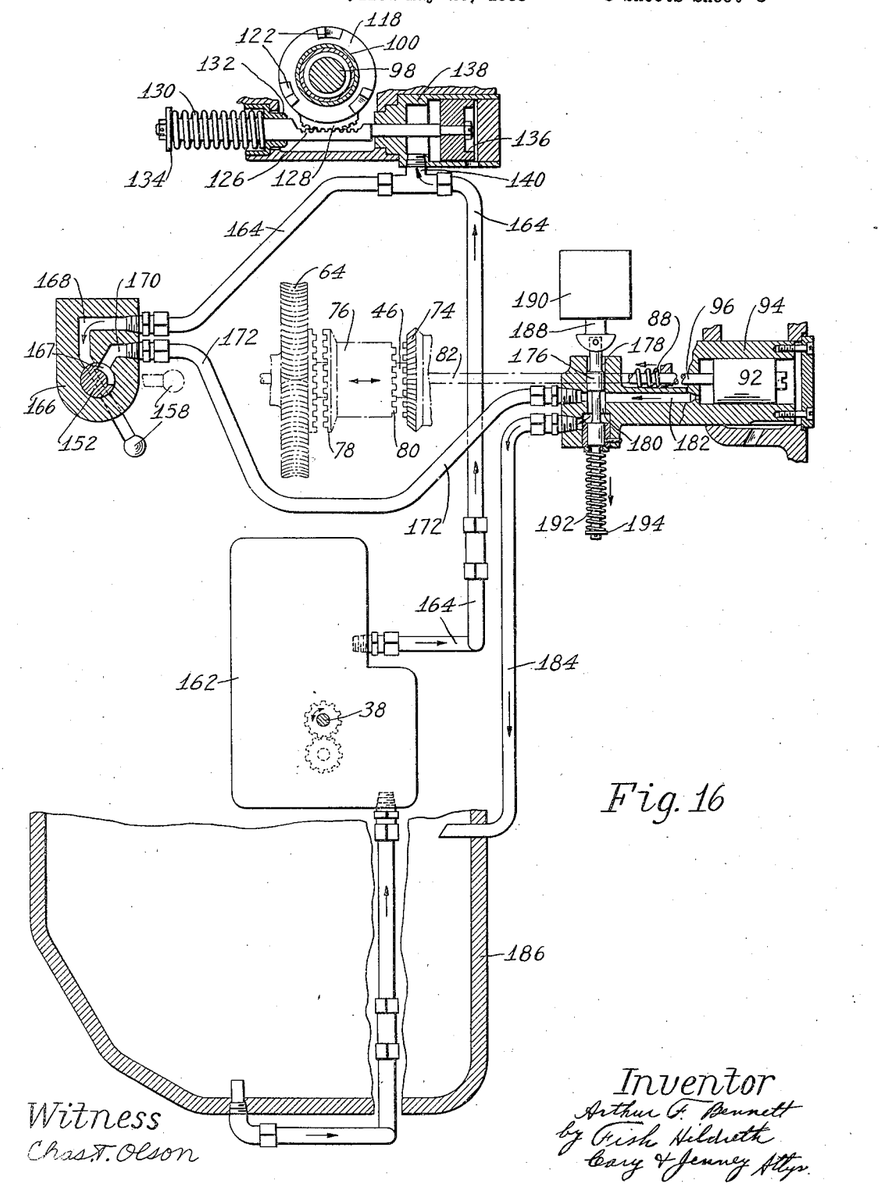

In accordance with a principal feature of the present invention, a control system is provided for controlling the operation of the take-up device hereinbefore described, to render said device operative to provide a tight operating engagement between the screw and nut elements during the power slow feed of the machine in either direction, and acting simultaneously with the movement of the clutch 76 to quick traverse position to ease off said device to permit a free working engagement of the feed screw and nut elements. There is also provided in the present construction, means rendered operative by the movement of the hand feed control member 158 into position for engaging the hand feed, to ease off the take-up device and permit a free operating engagement between the feed screw and nut elements during the manual operation of the table. As illustrated in Figs. 14, 15 and 16, an oil pressure control system is provided for controlling the operation of the slow speed and quick traverse clutch 76, and also for controlling the operation of the take-up device. Oil pressure is supplied from a reversible pump 162 directly connected to the armature shaft 38 of the table driving motor 36 through a conduit 164 to the inlet 140 to the oil pressure cylinder 138 for controlling the operation of the rack bar 126 of the take-up device. Fluid under pressure is carried from this point through an extension of the conduit 164 to a valve 166 which is controlled by the hand feed control lever 158, and comprises a channel 167 formed in the plug 152, and inlet and outlet ports 168 and 170 formed in the valve casing. The outlet port 170 is connected by a conduit 172 to a valve 174 which controls the operation of the slow feed and quick traverse clutch 76. The valve 174 comprises a piston 176 arranged for movement in a cylindrical chamber 178, and having formed thereon a cylindrical port 180. In addition to the inlet provided by the conduit 172, there is an outlet 182 to the oil pressure chamber 94 for controlling the operation of the slow speed and quick traverse clutch 76, and an outlet 184 to the sump 186. At its upper end the piston 176 is connected to the armature 188 of a solenoid 190, and at its lower end is provided with an extension on which is coiled a compression spring 192 which engages at one end with a collar 194 on the extension, and at its other end with the valve casing 174.

The operation of the control system for slow feed power operation of the machine, is illustrated in Fig. 14. As shown in this figure, the hand feed control lever 158 is in its inoperative position to permit a free flow of oil under pressure through the valve 166. The solenoid 190 is de-energized so that the piston 176 of the valve 174 occupies a depressed position under the influence of its spring 192 to allow a passage for the oil through the outlet 184 to the sump. Under these conditions no pressure is applied to the pressure cylinder 138 for the take-up device, so that the rack 126 is permitted to move under the pressure of its spring 130 to secure a tight operating engagement between the feed screw and nut elements. Similarly, pressure is exhausted from the cylinder 94 for controlling the operation of the slow feed and quick traverse clutch 76, so that the clutch is permitted to move to a slow feed position in engagement with the feed worm gear 64 under the pressure of the spring 88.

For a quick traverse operation of the machine, the solenoid 190 is energized to raise the piston 176, shutting off the exhaust conduit 184 to the sump. Under these conditions, as illustrated in Fig. 15 of the drawings, the oil pressure is built up in the pressure cylinder 138 to move the rack bar 126 to the right against the pressure of its spring 130 to relieve the tension of the nuts 100 and 102, so that a free operating engagement is provided between the feed screw and nut elements. At the same time pressure is permitted to build up in the pressure cylinder 94 to move the piston 92 to the right against the pressure of the spring 88 to disengage the slow feed and quick traverse clutch 76 from the slow feed driving worm gear 64, and to engage the clutch with the quick traverse bevel gear 74 to drive the machine at a quick traverse rate.

The operation of the control system for the hand operation of the machine is illustrated in Fig. 16. At this time the solenoid 190 is de-energized, allowing the piston 176 to move to its depressed position, opening the exhaust conduit 184 to the sump to exhaust the pressure from the pressure cylinder 94. The control lever 158 is now moved to its depressed position, as shown in Fig. 16, to permit the engagement of the hand feed, simultaneously causing the valve 166 to be closed by the rotation of the plug 152. Pressure is consequently built up in the cylinder 138 to move the rack bar 126 to the right against the pressure of its spring 130 to relieve the tension on the nuts 100 and 102, so that a free operating engagement is provided between the feed screw and nut elements to permit an easy and unobstructed operation of the hand feed lever by the operator.

Figures 1, 2:
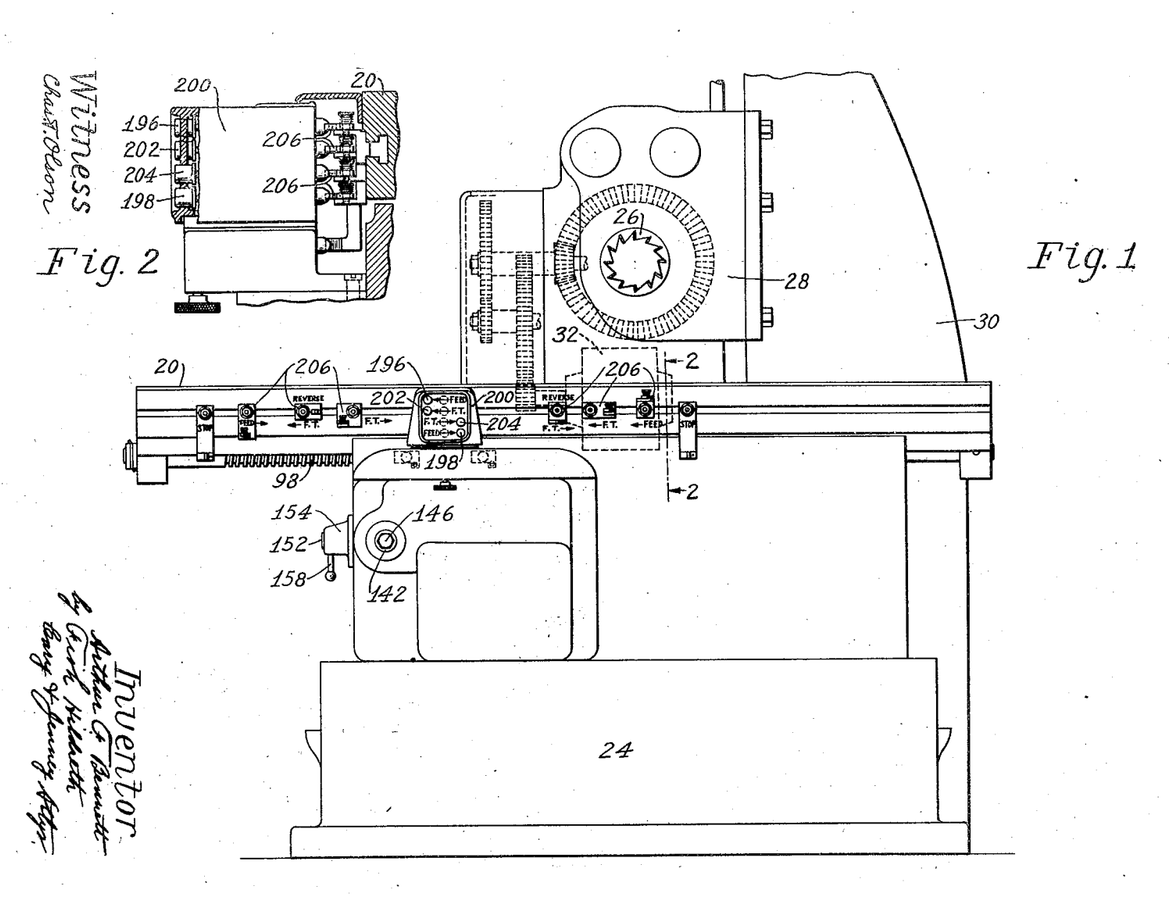
Fig. 1 is a view in front elevation of a milling machine embodying in a preferred form the several features of the present invention.
Fig. 2 is a detail sectional view taken on the line 2—2 of Fig. 1 to illustrate particularly the control post and the manual and automatic switch control buttons supported thereon.

The electrical controls for reversing the direction of drive of the table driving motor 36 to reverse the direction of feed, and for energizing the solenoid 190 to engage the quick traverse feed as above described, are generally indicated in Fig. 1 of the drawings. The direction of motor drive may be reversed manually by the switch buttons 196 and 198 which are mounted on a control post 200 at the front side of the table, as indicated generally in Fig. 1, and act through electrical connections including a reversing switch which may be of any ordinary description. A quick traverse drive for the table in either direction may be obtained manually by means of switch buttons 202 and 204 which are also mounted on the control post 200, and act through electrical connections to energize the solenoid 190 as above described. For securing the automatic operation of the machine, suitable dogs 206 are mounted on the front side of the table to engage with corresponding switch contacts on the adjacent side of the control post 200. Inasmuch, however, as the present invention is not concerned with the specific structure and mode of operation of these controls which form specifically the subject-matter of a separate application, further illustration herein of these elements is believed unnecessary.

A preferred embodiment of the invention having been described, and the nature and scope of the invention having been indicated, what is claimed is:

1. In a machine tool, the combination of a tool, a tool support, a work support, cooperating feed screw and nut elements for moving one of said supports, driving connections for relatively rotating said feed screw and nut elements to drive said movable support, a take-up device having a take-up action to maintain a tight working engagement between said feed screw and nut elements, means to ease off said take-up device and permit a free operating engagement between said feed screw and nut elements, and control devices arranged when rendered operative to establish certain operating conditions for said support and simultaneously to actuate said ease-off means to ease off the take-up device.

2. In a machine tool, the combination of a tool, a tool support, a work support, cooperating feed screw and nut elements for moving one of said supports, driving connections for relatively rotating said feed screw and nut elements to drive said movable support, a take-up device having a take-up action to maintain a tight working engagement between said feed screw and nut elements, means for easing off said take-up device to provide a free operating engagement between said feed screw and nut elements, control devices adapted to establish any one of a plurality of operating conditions for said support, and means controlled by said control devices simultaneously to control the operation of said ease-off means to produce a corresponding predetermined condition of operation of said take-up device.

3. In a machine tool, the combintion of a tool, a movable work support, cooperating feed screw and nut elements for actuating the table, driving mechanism for relatively rotating said feed screw and nut elements adjustable to drive the table alternatively at slow feeding and quick traverse rates, a take-up device having a take-up action to maintain a tight operating engagement between said feed screw and nut elements, means to ease off said take-up device, and control means acting when rendered operative to effect an adjustment of said driving mechanism to quick traverse position, and simultaneously to actuate said ease-off means to ease off said take-up device to permit a free operating engagement between said feed screw and nut elements.

4. In a machine tool, the combination of a movable support, cooperating feed screw and nut elements for actuating the table, driving mechanism for relatively rotating the nuts and feed screw to drive the table comprising trains for moving the support at a plurality of different rates, control means for rendering one or the other of said trains operative to drive the support at different rates, a take-up device having a take-up action to maintain a tight working engagement between said feed screw and nut elements, and means actuated upon the engagement of one of said trains for driving the support to ease off said take-up device to provide a free operating engagement between the nuts and the screw.

5. In a machine tool, the combination of a tool, a movable work supporting table, a feed screw, a pair of nuts threaded thereto, driving mechanism for relatively rotating the nuts and the feed screw adjustable to drive the table alternatively at feeding and quick traverse rates, control means for effecting an adjustment of said driving mechanism alternatively to feeding or quick traverse positions, a take-up device for controlling the relative positions of the nuts to maintain a tight working engagement between the nuts and the screw, means for easing off said take-up device, and means actuated upon the movement of said control means to quick traverse position simultaneously to actuate said ease-off means to ease off said take-up device to provide a free operating engagement between the nuts and the screw.

6. In a machine tool, the combination of a milling cutter, a movable work supporting table, a feed screw, a pair of nuts threaded thereto, driving mechanism for relatively rotating the nuts and the feed screw to drive the table including a clutch mechanism shiftable to drive the table alternatively at feeding and quick traverse rates, a take-up device for controlling the relative positions of the nuts to eliminate backlash between the nuts and the screw, and means controlled by the movement of said clutch to quick traverse position to ease off said take-up device to provide a free operating engagement between the nuts and the screw.

7. In a machine tool, the combination of a tool, a movable work table, cooperating feed screw and nut elements for driving the table, a power drive for relatively rotating said feed screw and nut elements to drive the table, a take-up device having a take-up action to maintain a tight operating engagement between said feed screw and nut elements, connections for manually operating said table, means to ease off said take-up device and control means for setting the machine for manual operation arranged simultaneously to actuate said ease-off means to ease off said take-up device to permit free operating engagement between said feed screw and nut elements.

8. In a machine tool, the combination of a tool, a movable work table, cooperating feed screw and nut elements for driving the table, a power drive for imparting relative rotational movements to the feed screw and nut elements including clutch mechanism adjustable to drive the table alternatively at a slow feed or quick traverse rate, a take-up device having a take-up action to maintain a tight operating engagement between said feed screw and nut elements, a fluid pressure cylinder for operating said clutch connections, a fluid pressure cylinder for controlling the operation of said take-up device, and valve control means acting when rendered operative to move said clutch connections to quick traverse position, and simultaneously to ease off said take-up device to permit a free operating engagement between the feed screw and nut elements.

9. In a machine tool, the combination of a tool, a movable work support, cooperating feed screw and nut elements for actuating the support, a power drive for imparting relative rotational movements to said feed screw and nut elements to drive the support including clutch connections having neutral, slow feed and quick traverse positions, a take-up device having a take-up action to maintain a tight operating engagement between said feed screw and nut elements, manual feed connections for manually operating said support, and control means for setting the machine for manual operation arranged when actuated to disengage the power drive and simultaneously to ease off said take-up device to permit a free operating engagement between said feed screw and nut elements.

10. In a machine tool, the combination of a tool, a movable work support, driving connections including cooperating feed screw and nut elements for driving the support, slow feed and quick traverse clutch connections for driving the support alternatively at a slow feed or quick traverse rate, a take-up device having a take-up action to maintain a tight operating engagement between said feed screw and nut elements, and devices operated by fluid pressure for controlling simultaneously the operation of said take-up and clutch mechanism comprising a fluid pressure operated piston for controlling said take-up device, a fluid pressure operated piston rendered operative to move said clutch connections to quick traverse position, and a control valve arranged when actuated to control the application of fluid pressure simultaneously to said pistons to ease off said take-up device and to move said clutch connections to quick traverse position.

11. In a machine tool, the combination of a tool, a movable work support, cooperating feed screw and nut elements for actuating the support, a power drive for imparting relative rotational movements to said feed screw and nut elements to drive the support, a take-up device having a take-up action to maintain a tight operating engagement between said feed screw and nut elements, a fluid pressure operated piston for controlling said take-up device, manual feed connections for manually operating said support, and control means for setting the machine for manual operation arranged when actuated to disengage the power drive and simultaneously to control the application of fluid pressure to said piston to ease off the take-up device.

12. In a machine tool, the combination of a tool, a movable work support, cooperating feed screw and nut elements for driving the support, a power drive for relatively rotating said feed screw and nut elements adjustable to drive the support alternatively at slow feeding and quick traverse rates, a take-up device having a take-up action to maintain a tight operating engagement between said feed screw and nut elements, and means for controlling the operation of said take-up device arranged to act simultaneously with the adjustment of said drive for quick traverse operation to ease off the take-up device to provide a free operating engagement between said feed screw and nut elements, and to act simultaneously with the adjustment of said drive for slow feed operation to return the take-up device to acting operation.

13. In a machine tool, the combination of a tool, a movable work support, a feed screw, a pair of nuts threaded thereto, driving mechanism for relatively rotating said feed screw and nuts to drive the support including a speed control element shiftable to drive the support alternatively at feeding and quick traverse rates, a take-up device for controlling the relative positions of the nuts to eliminate backlash between the screw and the nuts, and means controlled by the movement of said element to quick traverse position to ease off said take-up device to provide a free operating engagement between the screw and the nuts, and by the movement of said element to slow feed position to return said take-up device to active operation.

14. In a machine tool, the combination of a tool, a movable work support, driving connections including cooperating feed screw and nut elements for driving the support, slow feed and quick traverse clutch connections for driving the support alternatively at a slow feed or quick traverse rate, a take-up device having a take-up action to maintain a tight operating engagement between said feed screw and nut elements, and devices operated by fluid pressure for controlling simultaneously the operation of said take-up and clutch mechanisms comprising a fluid pressure operated piston for controlling said take-up device, a fluid pressure operated piston for controlling said clutch connections, and a control valve for controlling the application of fluid pressure to said pistons arranged for one position of the valve to move said clutch connections to quick traverse position and simultaneously to ease off said take-up device, and for another position of said valve to move said clutch connections to slow feed position and simultaneously to return said take-up device to active operation.

15. In a machine tool, the combination of a tool, a movable work support, cooperating feed screw and nut elements for driving the support, a power drive for relatively rotating said feed screw and nut elements to drive the support, a take-up device having a take-up action to maintain a tight operating engagement between said feed screw and nut elements, manual feed connections for manually operating said support, control means for setting the machine for manual operation, and means for controlling the operation of said take-up device rendered operative simultaneously with the setting of the machine for manual operation to ease off the take-up device to provide a free operating engagement between said feed screw and nut elements, and to return the take-up device to active operation simultaneously with the engagement of the power drive.

16. In a machine tool, the combination of a tool, a movable work support, cooperating feed screw and nut elements for actuating said support, a power drive for imparting relative rotational movements to said feed screw and nut elements to drive the support, a take-up device having a take-up action to maintain a tight operating engagement between said feed screw and nut elements, a fluid pressure operated piston for controlling said take-up device, manual feed connections for manually operating said support, control means for setting the machine for manual operation, and means for controlling the application of fluid pressure to said piston rendered operative simultaneously with the setting of the machine for manual operation to ease off the take-up device to provide a free operating engagement between said feed screw and nut elements, and rendered operative simultaneously with the engagement of the power drive to return the take-up device to active operation.

17. In a machine tool, the combination of a tool, a movable work support, driving connections including cooperating feed screw and nut elements for driving the support, slow feed and quick traverse clutch connections for driving the support alternatively at a slow feed or quick traverse rate, a take-up device having a take-up action to maintain a tight operating engagement between said feed screw and nut elements, and devices operated by fluid pressure for controlling simultaneously the operation of said take-up and clutch mechanism comprising a fluid pressure operated piston for controlling said take-up device, fluid pressure operated means for controlling the position of said clutch, and a control valve arranged when actuated to control the application of fluid pressure to each of said piston and said fluid pressure operated control means simultaneously to ease off said take-up device and to move said clutch connections to quick traverse position.

ARTHUR F. BENNETT.